US008662049B2

(12) United States Patent
Nodl

(10) Patent No.: US 8,662,049 B2
(45) Date of Patent: Mar. 4, 2014

(54) CAST PISTON HAVING SUPPORTING RIBS, AND METHOD FOR THE PRODUCTION OF SUCH A PISTON

(75) Inventor: Martin Nodl, Nuremburg (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 324 days.

(21) Appl. No.: 12/746,400

(22) PCT Filed: Oct. 2, 2008

(86) PCT No.: PCT/EP2008/063225

§ 371 (c)(1), (2), (4) Date: Aug. 23, 2010

(87) PCT Pub. No.: WO2009/071354

PCT Pub. Date: Jun. 11, 2009

(65) Prior Publication Data

US 2010/0307446 A1 Dec. 9, 2010

(30) Foreign Application Priority Data

Dec. 6, 2007 (DE) ......................... 10 2007 058 789

(51) Int. Cl.
*F02F 3/00* (2006.01)
*F16J 1/00* (2006.01)

(52) U.S. Cl.
USPC ....................................................... 123/193.6

(58) Field of Classification Search
USPC ......................... 123/193.6; 92/187, 216, 222; 29/888.04, 888.044, 888.047
See application file for complete search history.

(56) References Cited

U.S. PATENT DOCUMENTS 2,006,008 A * 6/1935 Nelson ............................ 92/230
4,161,165 A * 7/1979 Belush et al. .............. 123/193.6
4,662,319 A * 5/1987 Ayoul ........................ 123/41.35
4,876,947 A * 10/1989 Rhodes ........................... 92/187
5,839,407 A * 11/1998 Suzuki et al. .............. 123/193.6
2008/0216790 A1 9/2008 Breidenbach et al.
2010/0147252 A1* 6/2010 Langner et al. ............ 123/193.6

FOREIGN PATENT DOCUMENTS

| | | |
|---|---|---|
| CH | 223131 | 8/1942 |
| DE | 708137 | 6/1941 |
| DE | 1805533 | 10/1968 |
| DE | 69901902 | 1/2003 |
| DE | 102005043747 | 3/2007 |
| EP | 1561938 | 8/2005 |
| FR | 782736 | 6/1935 |
| FR | 898905 | 5/1945 |
| GB | 431743 | 7/1935 |
| JP | 2007309271 | 11/2007 |
| WO | 9960258 | 11/1999 |

* cited by examiner

*Primary Examiner* — M. McMahon
(74) *Attorney, Agent, or Firm* — Robert L. Stearns; Dickinson Wright, PLLC

(57) ABSTRACT

The invention relates to a cast piston for an internal combustion engine having a piston base, a cylindrical piston head connected to the piston base, and pin bores provided in an at least partially hollow piston shaft, which is positioned on the side of the piston head opposite the piston base. The piston has one or more supporting ribs located at least partially in the piston shaft, and at least one supporting rib has a recess on the side facing the piston base.

11 Claims, 1 Drawing Sheet

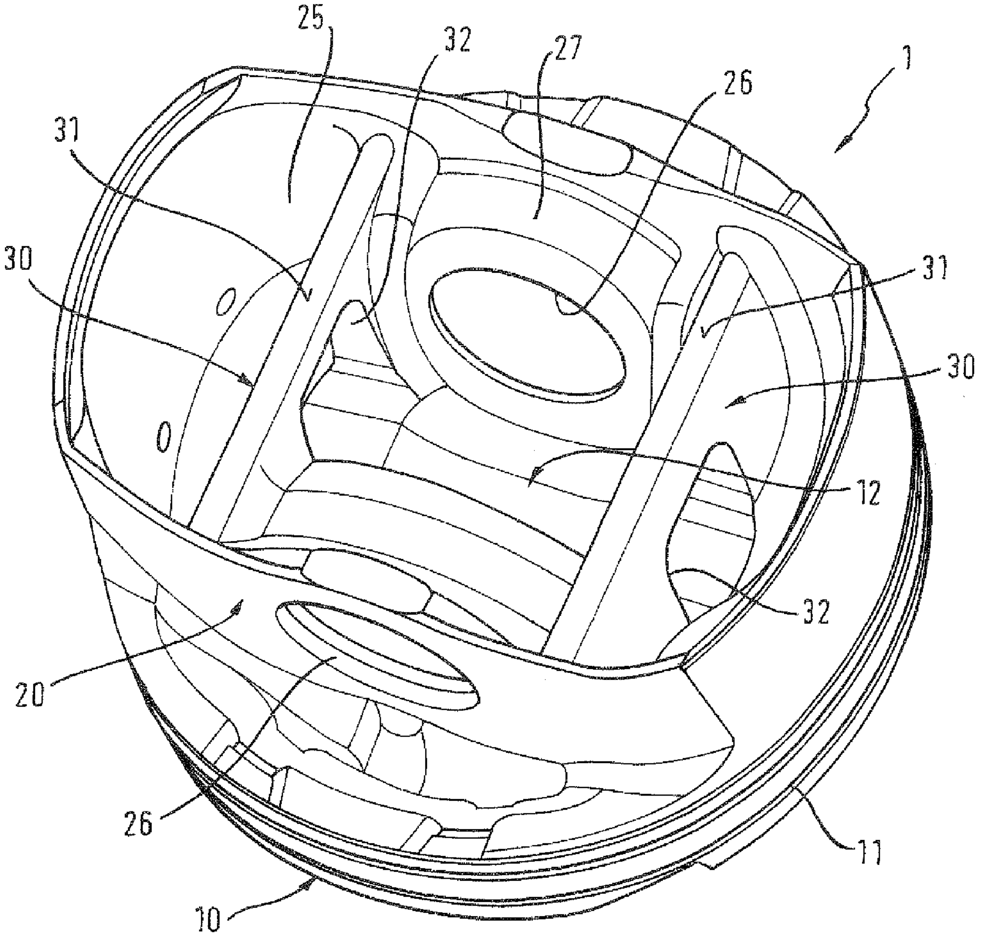
25
32
27
26
1
31
30
31
30
12
32
20
26
11
10

CAST PISTON HAVING SUPPORTING RIBS, AND METHOD FOR THE PRODUCTION OF SUCH A PISTON

TECHNICAL FIELD

The invention concerns a cast piston having supporting ribs for an internal combustion engine as well as a method for the production of such a piston.

PRIOR ART

Pistons for internal combustion engines are subject to high mechanical and thermal stresses during operation. Depending on its use the piston construction, the materials used and other configurational features can be optimized, for example with respect to its structural rigidity or its weight. Further additional conditions to be considered are costs and durability.

Here, a trade-off has to be made between the simultaneous maximization of structural rigidity and the minimization of the weight of the piston. An increase in the structural rigidity may be achieved by strengthening parts and/or regions of the piston which are subject to particularly high stresses. Such a strengthening increases the weight of the piston. This, in turn, results in an increase in consumption and an increase in production and operating costs.

Document EP 1 561 938 A1 shows a piston in which ribs are applied at the pin bores, which ribs are completely connected with the piston head along the lower side and are situated substantially below the pin bore.

Document DE 10 2005 0143 747 A1 shows a piston for an internal combustion engine, in which the supporting ribs form a part of the periphery of the piston skirt and are completely connected with the piston base along the edge facing the piston base.

The ribs known from the prior art are directed (adapted) to the field of use, the requirements and the production limitations of forged pistons.

Document DE 699 01 902 T2 describes a piston for use in an engine. The piston has a plurality of struts provided in the piston skirt. Document DE 1 805 533 A relates to a piston for internal combustion engines, wherein the piston comprises planar inserts standing perpendicular on the pin axis. Document GB 431 743 A discloses a piston having struts provided at the piston skirt.

SUMMARY OF THE INVENTION

It is an object of the present invention to provide a cast piston having an improved structural rigidity while at the same time optimizing its weight, as well as a suitable production method therefor.

Thus, a cast piston for an internal combustion engine comprises a piston base, a cylindrical piston head connected to the piston base and an at least partially hollow piston skirt located at the side of the piston head facing away from the piston base. The cast piston is characterized in that it comprises one or more supporting ribs located at least partially in the piston skirt, with at least one supporting rib having a recess on the side facing the piston base. The supporting ribs provided in the piston skirt reinforce the piston skirt. Further, by appropriately arranging the supporting ribs, regions experiencing high stresses and needing reinforcement may be strengthened in a targeted mariner. Due to a targeted strengthening, material at another location, for instance at the wall thickness of the piston skirt, may be saved in favor of an optimization of its weight, depending upon the field of use of the piston. The supporting ribs are located within the piston skirt in order to reinforce regions close to the pin bores which are provided in the peripheral wall of the piston skirt. The recesses of the supporting ribs at the side facing the piston base serve the purpose of reducing the weight in areas which do not require additional reinforcement. Further, spray oil and/or guided oil may reach the pin through these recesses. Thus, the piston can be adequately cooled and better lubricated in the area of the pin bores and con-rod. The supporting ribs may be formed or cast integrally with the piston skirt in order to achieve an as large as possible material homogeneity in particular in those areas subject to high stresses. Further, by integrally casting the piston, it may be manufactured without any further additional processing of the ribs. The formation of the ribs is, thus, integrated into the casting operation. Therefore, such a method is particularly productive and, thus, suited to high-volume production.

According to the invention, the supporting ribs are connected to the walls of the piston body in the vicinity of the piston bore in order to combine a reinforcement by flanges and by supporting ribs.

Preferably, the cast piston is made of aluminium in order to reduce the weight of the piston. Aluminium has the necessary heat resistance, light weight and structural rigidity.

Preferably, the supporting ribs are disposed substantially parallel to the pin axis. The pin axis is defined by two pin bores. Such an arrangement efficiently strengthens the heavily stressed areas around the pin bores. Further, the parallel arrangement of the supporting ribs with respect to the pin axis provides for the shortest connection of the opposing sides of the pin body, so that material can be saved and, consequently, the weight of the piston can be optimized.

Preferably, the supporting ribs are substantially perpendicular to the walls of the piston skirt in order to optimize the structural rigidity of the piston.

Preferably, the supporting ribs are planar (laminar), wherein an edge of one such rib extends substantially parallel to the piston base and at least one surface adjoining this edge is disposed substantially perpendicular with respect to the piston base, in order to improve the structural rigidity of the piston.

Preferably, exactly two supporting ribs are provided. Such a strengthening, preferably with a supporting rib being mirror-symmetrically provided at both sides of the pin bores, respectively, promises an effective improvement of the structural rigidity around the heavily stressed areas of the pin bores.

Preferably, the supporting ribs are not integrally formed with the piston base. It is not necessary to connect the supporting ribs with the piston base, which may be exploited in favor of a lower material consumption.

Preferably, each supporting rib connects two sides of the piston skirt. In order to achieve an effective reinforcement of the piston, a continuous connection of two sides, preferably the sides having the pin bores, is effective.

Preferably, the edge of the supporting ribs facing away from the piston base is located at a greater distance from the piston base than the central axis of the pin bores, in order to reinforce the piston skirt, in particular. In particular, this edge may be located at a greater distance from the piston base than the pin bores as a whole, and the recess may extend from the piston base across the central axis and up to the region of the end of the pin bore facing away from the piston base.

The object is further achieved by means of a method for the production of the above-mentioned cast piston, wherein the recess is formed during casting of the supporting ribs, for example by means of a suitable core.

BRIEF DESCRIPTION OF THE DRAWING

FIG. 1 is a perspective view of a cast piston according to the invention.

DETAILED DESCRIPTION OF AN EMBODIMENT OF THE INVENTION

The cast piston 1 of the invention shown in FIG. 1 comprises a piston head 10 having a piston base 12 and a piston skirt 20. The piston head 10 has a cylindrical shape and is provided with ring grooves 11 along its outer periphery. Adjacent to the piston head 10, and pointing upward in the Figure (out of the paper plane), is the piston skirt 20 which has a cavity 25. The piston skirt 20 does not need to have a circularly cylindrical shape, as is presently the case. In the present embodiment, the piston skirt 20 comprises walls recessed from the periphery so that the piston skirt 20 approaches the shape of a box. In the peripheral region of the piston skirt 20 two opposing pin bores 26 for receiving a pin are provided. The pin bores are strengthened by pin flanges 27. These pin bores 26 may be provided with a safety ring, not shown in the Figure, which is molded into a groove formed in the pin bore 26. A pin not shown in the Figure is supported in the pin bores 26 and serves as axis for the small con-rod eye of a con-rod (not shown). The cavity 25 of the piston 1 is configured so as to allow a rotation of the con-rod by an amplitude determined by the stroke of the piston 1, by the con-rod and by the crank shaft.

Two supporting ribs 30 extend in parallel to the pin axis which is defined by the two pin bores 26. The two supporting ribs are provided symmetrically on both sides of the pin (not shown) and connect the opposing flattened sides of the piston skirt 20. The ribs 30 have a planar (laminar) configuration and comprise upper edges 31. One such upper edge 31 of the supporting ribs may be disposed above the center line of the pin axis, as realized in the present embodiment. Further, the upper edge 31 of the supporting ribs 30 is disposed parallel to the pin axis and parallel to the piston base 12. Due to technical reasons of the casting operation it may be necessary that the ribs 30 have a double conical shape, that is the parallelism is only hinted at and the edge 31 bulges outward, in particular in the area of its connection with the piston skirt 20. The supporting ribs 30 which have a substantially planar configuration except for the connection area with the piston skirt 20, comprise recesses 32.

According to the field of use of the piston, it is not necessary to provide two parallel supporting ribs 30. For example, a supporting rib may be provided which connects the two flanges 27. In order to achieve a higher rigidity it may further be desirable to provide further supporting ribs in addition to the two parallel supporting ribs, for example a supporting rib connecting the two flanges at the center and below the pin bores. Further, the recesses may be configured smaller or larger in view of an optimization of weight and/or an optimization of structural rigidity.

The invention claimed is:

1. A cast piston for an internal combustion engine having a piston base, a cylindrical piston head adjacent to the piston base and an at least partially hollow piston skirt located on the side of the piston head facing away from the piston base, the piston skirt including a pair of opposing walls each including a pin bore suitable for receiving a pin, wherein the piston comprises at least one supporting rib located at least partially within the piston skirt, and the at least one supporting rib comprises at least one recess on the side facing the piston base, and wherein the at least one supporting rib is connected to the opposing walls of the piston skirt in the vicinity of the pin bores, and wherein the at least one supporting rib runs substantially in parallel to a pin axis defined by the two pin bores and substantially perpendicular to the pair of opposing walls of the piston skirt, and wherein the at least one supporting rib includes an upper edge which presents a convex surface facing away from the piston base.

2. The cast piston according to claim 1, wherein the piston is made of aluminium.

3. The cast piston according to claim 1, wherein the at least one supporting rib has a flat shape, wherein the upper edge of such rib extends substantially in parallel to the piston base, and at least one surface adjoining this upper edge is disposed substantially perpendicular with respect to the piston base.

4. The cast piston according to claim 1, wherein the at least one supporting rib consists of exactly two supporting ribs.

5. The cast piston according to claim 1, wherein the at least one supporting rib is not integrally formed with the piston base.

6. The cast piston according to claim 4, wherein each supporting rib connects the opposing walls of the piston skirt.

7. The cast piston according to claim 3, wherein the upper edge of the at least one supporting rib facing away from the piston base is located at a greater distance from the piston base than a central axis of the pin bores.

8. A method for the production of a cast piston comprising casting a piston base having a piston head and a piston skirt extending away from the piston base, the piston skirt including a pair of opposing walls each including a pin bore for receiving a pin;

fabricating at least one supporting rib with at least one recess and arranging the at least one supporting rib to the inside of the skirt in engagement with the opposing walls of the skirt adjacent the pin bores and with the at least one recess of the at least one supporting rib facing the piston base, and with the at least one supporting rib running substantially in parallel to a pin axis defined by the two pin bores and substantially perpendicular to the pair of opposing walls of the piston skirt, and with the at least one supporting rib including an upper edge which faces away from the piston base and presents a convex surface.

9. The method according to claim 8 wherein the at least one supporting rib is separately made from the piston base and subsequently joined to the walls of the piston skirt.

10. The method according to claim 8 wherein there are two of the supporting ribs that are fabricated and each joined to the opposite walls of the piston skirt in spaced relation to one another on opposite sides of the pin bores.

11. The method of claim 10 wherein the two supporting ribs run parallel to the pin axis of the pin bores and are parallel to one another.

* * * * *

UNITED STATES PATENT AND TRADEMARK OFFICE

CERTIFICATE OF CORRECTION

PATENT NO. : 8,662,049 B2
APPLICATION NO. : 12/746400
DATED : March 4, 2014
INVENTOR(S) : Martin Nodl It is certified that error appears in the above-identified patent and that said Letters Patent is hereby corrected as shown below:

On the Title page, item [75] inventor address, "Nuremburg (DE)" should read "Nuremberg (DE)"

Signed and Sealed this
Third Day of June, 2014

Michelle K. Lee
*Deputy Director of the United States Patent and Trademark Office*